United States Patent
Bodmer et al.

(10) Patent No.: US 6,483,215 B1
(45) Date of Patent: Nov. 19, 2002

(54) HYBRID AIR/FLUID BEARING

(75) Inventors: James Bodmer, Longmont, CO (US); Clement Chan, Longmont, CO (US); Shane Walker, Mead, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/417,285

(22) Filed: Oct. 13, 1999

(51) Int. Cl.[7] ............................. H02K 7/08; F16C 32/06
(52) U.S. Cl. ................................. 310/90; 384/107
(58) Field of Search ................ 310/90–90.5; 384/100, 384/107, 226, 227, 228, 132, 133, 134; 360/99.08

(56) References Cited

U.S. PATENT DOCUMENTS

| | | | |
|---|---|---|---|
| 4,200,344 A | 4/1980 | Binns et al. | 308/9 |
| 4,487,514 A | 12/1984 | Mori | 384/113 |
| 4,656,545 A | 4/1987 | Kakuta | 360/98 |
| 4,795,275 A | 1/1989 | Titcomb et al. | 384/107 |
| 4,998,033 A | 3/1991 | Hisabe et al. | 310/67 R |
| 5,040,085 A | 8/1991 | Elsasser et al. | 360/98.07 |
| 5,067,528 A | 11/1991 | Titcomb et al. | 141/4 |
| 5,112,142 A | 5/1992 | Titcomb et al. | 384/107 |
| 5,127,744 A | 7/1992 | White et al. | 384/112 |
| 5,246,294 A | 9/1993 | Pan | 384/119 |
| 5,283,491 A | 2/1994 | Jabbar et al. | 310/90 |
| 5,488,523 A | 1/1996 | Seaver et al. | 360/99.08 |
| 5,619,083 A | 4/1997 | Dunfield et al. | 310/90.5 |
| 5,658,080 A * | 8/1997 | Ichiyama | 384/112 |
| 5,707,154 A | 1/1998 | Ichiyama | 384/107 |
| 5,710,678 A | 1/1998 | Leuthold et al. | 360/99.08 |
| 5,770,906 A | 6/1998 | Hazelton et al. | 310/90 |
| 5,795,072 A | 8/1998 | Hwang | 384/100 |
| 5,864,443 A | 1/1999 | Elsaesser et al. | 360/99.08 |
| 5,880,545 A | 3/1999 | Takemura et al. | 310/90 |
| 5,940,246 A | 8/1999 | Khan et al. | 360/99.08 |
| 5,964,027 A | 10/1999 | Tochiyama | 29/596 |
| 5,969,448 A | 10/1999 | Liu et al. | 310/90 |
| 5,973,878 A | 10/1999 | Yoshida et al. | 360/98.07 |
| 5,977,674 A | 11/1999 | Leuthold et al. | 310/90 |
| 5,993,066 A | 11/1999 | Leuthold et al. | 384/113 |
| 6,036,369 A | 3/2000 | Ichiyama | 384/119 |
| 6,066,903 A * | 5/2000 | Ichiyama | 310/90 |
| 6,069,429 A * | 5/2000 | Yamamoto et al. | 310/90 |
| 6,069,767 A | 5/2000 | Khan et al. | 360/99.08 |
| 6,071,014 A * | 6/2000 | Lee et al. | 384/107 |
| 6,118,620 A | 9/2000 | Grantz et al. | 360/99.08 |
| 6,137,650 A | 10/2000 | Heine et al. | 360/98.07 |
| 6,147,424 A | 11/2000 | Gomyo et al. | 310/90 |

FOREIGN PATENT DOCUMENTS

| | | | |
|---|---|---|---|
| JP | 2000-215590 | 8/2000 | F16C/17/10 |

OTHER PUBLICATIONS

IBM Technical Disclosure Bulletin, vol. 29, No. 5, pp. 2233–2234 (Oct. 1986).

(List continued on next page.)

*Primary Examiner*—Dang Dinh Le
(74) *Attorney, Agent, or Firm*—Sheridan Ross P.C.

(57) ABSTRACT

A method and apparatus for rotatably interconnecting computer storage disks to a stationary base is provided. The apparatus provides a hybrid bearing assembly having an oil-filled thrust bearing and an air-filled radial bearing. In particular, the apparatus provides a hybrid bearing having an oil-filled thrust bearing that is highly resistant to leakage. In addition, the apparatus provides a hybrid bearing having a radial air bearing with a very large diameter to provide great stiffness in a radial direction using common manufacturing tolerances. The method of the present invention includes rotatably interconnecting a hub for suspending computer storage media to a base or enclosure using an oil-filled thrust bearing and an air-filled radial bearing. The method further includes balancing the pressures in both directions along the axis of the thrust bearing to prevent leakage of the oil from the bearing. The method also includes providing an air bearing having a very large diameter.

53 Claims, 3 Drawing Sheets

OTHER PUBLICATIONS

Shixin Chen, Qide Zhang and Zhejie Liu, "Hybrid Spindle Motor Bearing Mixes Oil and Air," Data Storage, pp. 25–30 (Dec. 1998).

Chen Shi–Xin, Liu Zhe–jie, Low Teck–Seng and Zhang Qi–De, "Future High Speed Spindle and Components for Hard Disk Drives," Insight (Jan./Feb. 1999).

Yoshikazu Ichiyama, NIDEC figure from presentation given on Dec. 18, 1998.

Chris Onozuka, Mitsubish Electric, summary of features of air dynamic bearing motors.

* cited by examiner

HYBRID AIR/FLUID BEARING

FIELD OF THE INVENTION

The present invention relates to hybrid bearings, and in particular to hybrid bearings used in conjunction with hard disk drive spindle motors. The invention further relates to hybrid bearings used in disk drive spindle motors having an air radial bearing and a fluid thrust bearing.

BACKGROUND OF THE INVENTION

Disk drive memory systems store digital information on magnetic disks. The information is stored on the disks in concentric tracks divided into sectors. The disks themselves are mounted on a hub, which rotates relative to the disk drive enclosure. Information is accessed by means of read/write heads mounted on pivoting arms able to move radially over the surface of the disks. This radial movement of the transducer heads allows different tracks to be accessed. Rotation of the disks allows the read/write head to access different sectors on the disks.

In operation, the disk or disks comprising the magnetic media are rotated at very high speeds by means of an electric motor generally, but not necessarily, located inside the hub that supports the individual disks. Bearings mounted inside the hub allow the hub to rotate about a fixed shaft. Alternatively, the hub is fixed to a rotating shaft carried by bearings mounted to the base or enclosure of the disk drive. In either configuration, the bearings are typically ball-bearings or fluid bearings. Bearings having a fluid lubricant are desirable for disk drive applications because of their inherently low nonrepeatable runout and low acoustical noise. However, these bearings suffer from several shortcomings. For instance, oil filled bearing designs have been difficult to seal. In particular, where oil filled bearings are used to support a rotatable hub in radial and axial directions, it is extremely difficult to balance the pressure exerted on the oil between all of the surfaces of the bearing. As a result, oil can be forced from between the bearing surfaces, contaminating the interior of the disk drive. Such contamination may cause a failure or a decreased performance of the drive. Bearing systems incorporating an oil lubricant also have a limited maximum rotational speed, due to large power consumption at high speeds.

Alternative bearing designs have utilized air as the lubricant with bearings having grooved bearing surfaces to generate areas of increased pressure when the surfaces of the bearing move in opposition to each other. However, such designs typically only have a unidirectional thrust mechanism, and therefore the disk drive can only be operated when the device is in certain orientations (e.g. upright) or the device cannot withstand shock in certain directions (e.g. the axial direction). Furthermore, air bearing designs have typically featured a relatively small diameter radial bearing surface, resulting in bearings that have inadequate stiffness. Adequate stiffness is difficult to achieve in an air bearing because air has a viscosity that is much lower than the viscosity of oil or other conventional liquid lubricants. Therefore, conventional air bearing designs result in a bearing that cannot maintain the rotating components in a precise relationship to the stationary components when bearings constructed in accordance with those designs are subjected to external forces. Stated differently, a bearing that lacks stiffness will allow the rotating disks to deviate from the desired alignment when the drive is subjected to external forces.

Air is desirable as a bearing lubricant because its use removes concerns about leakage and outgassing resulting from the presence of oil. In addition, the viscosity of air varies less with changes in temperature compared to the viscosity of oil or other lubricants. Furthermore, air bearings generate less acoustical noise and less nonrepeatable runout than ball-bearing designs, and consume less power in comparable situations due to decreased friction compared to oil filled bearings. However, existing air bearing designs use extremely high rotational speeds and/or extremely tight internal clearances to increase the stiffness of the bearing in order to achieve stiffness levels that are comparable to the stiffness of oil-filled bearings. This is due in large part to the fact that the viscosity of air is approximately $1/700$th the viscosity of oil. However, increased rotational speeds generally reduce the storage capacity of the disk drive because of limitations in read/write channel data rates. Also, the tight internal clearances typically employed by known air bearing designs increase manufacturing costs.

It would be desirable to provide a bearing system for a disk drive motor assembly that presents a low risk of contamination to the storage media, and one that is stiff enough to support a heavy disk pack and/or withstand external shocks. In addition, it would be desirable to provide such a device with reduced friction, reduced power consumption and wear and tear, and a longer life than conventional bearing systems. Furthermore, it would be desirable that such a device be easy to manufacture in large volumes and at low cost.

SUMMARY OF THE INVENTION

In accordance with the present invention, an apparatus and method for supporting a rotating component is disclosed. In particular, the invention provides a computer disk drive spindle bearing having an air-filled bearing for support in a radial direction and an oil-filled bearing for support in an axial direction. In a preferred embodiment, the air bearing has a large diameter with respect to the spindle. In addition, the present invention provides an oil-filled bearing that is resistant to leakage for supporting the rotating hub in an axial direction.

The device generally includes a stationary shaft fixed or interconnected to a base. Affixed to the stationary shaft is a thrust plate for use as a part of an oil filled bearing. The thrust plate cooperates with upper and lower bearing plates interconnected to a hub to support the hub in an axial direction. The space between the thrust plate and the upper and lower bearing plates is filled with a viscous oil. The viscous oil insures that the bearing has high stiffness and high load capacity.

Also interconnected to the stationary shaft is an air bearing element having a large diameter. A large diameter is desirable because the stiffness of such a bearing increases with the cube of the diameter. In a preferred embodiment, the air bearing element substantially fills the volume defined by the interior surface of the rotating hub. In a more preferred embodiment, the diameter of the air bearing is greater than or equal to the diameter of the thrust plate of the oil filled bearing. In another preferred embodiment, the volume of the air bearing element is at least about 80% of the volume defined by the interior surface of the rotating hub.

The air bearing is also preferably relatively tall. As with the relatively large diameter, a relatively tall bearing is desirable because it provides greater stiffness and greater load capacity. Furthermore, increases in stiffness and load capacity gained by making the bearing larger can allow the bearing to be manufactured to tolerances that are no more stringent than those typically maintained for oil-filled bearing disk drive designs. In a preferred embodiment, the length of the air bearing is at least about 50% of the height of the hub surface about which storage media disks are stacked. In a more preferred embodiment, the air bearing extends from the center line of the rotor of the electric motor used to rotate the hub about the spindle, to a level at least about halfway along the hub between the hub flange and the disk clamp.

As discussed above, the relatively large size of the air bearing element increases the stiffness of the air bearing. In addition, the air bearing element may be provided with pressure generating ridges or grooves. These ridges or grooves direct air away from the edges of the bearing to increase the air pressure along the surface of the bearing, improving the stiffness of the bearing. Increased stiffness allows the bearing to support a heavier disk pack, and to avoid damage that might otherwise be sustained due to external forces or shocks.

The bearing of the present invention also provides a disk drive spindle and housing that are themselves very stiff. This is due to the use of a stationary shaft, which can be affixed to the enclosure at both ends to ensure a very stiff disk drive assembly. The increased stiffness of the design improves the accuracy of the read/write head in relation to the storage disks, and lessens low frequency vibrations.

The unique combination of an oil-filled bearing for supporting the rotatable hub in an axial direction and an air-filled bearing for supporting the rotatable hub in a radial direction provides a bearing apparatus having lower friction than an all oil-filled bearing design. Therefore, the bearing of the present invention consumes less power in operation and permits the disks to rotate at higher speeds than an all oil-filled bearing design having similar load bearing capabilities. In addition, the bearing of the present invention has greater load capacity than an air bearing of similar dimensions, because an air bearing must be extremely large to provide comparable support in an axial direction. Therefore, the present design offers a bearing with a higher load capacity and/or smaller size than an all air bearing design. Yet another advantage of the bearing of the present invention is the low nonrepeatable runout obtained by using fluid filled bearings exclusively. Therefore, runout problems associated with ball bearing or contact bearing designs are avoided.

Additional advantages of the present invention will become readily apparent from the following discussion, particularly when taken together with the accompanying drawings.

DETAILED DESCRIPTION OF THE INVENTION

In accordance with the present invention, a hybrid disk drive bearing having an oil-filled thrust bearing and an air-filled radial bearing is provided.

Figure 1:
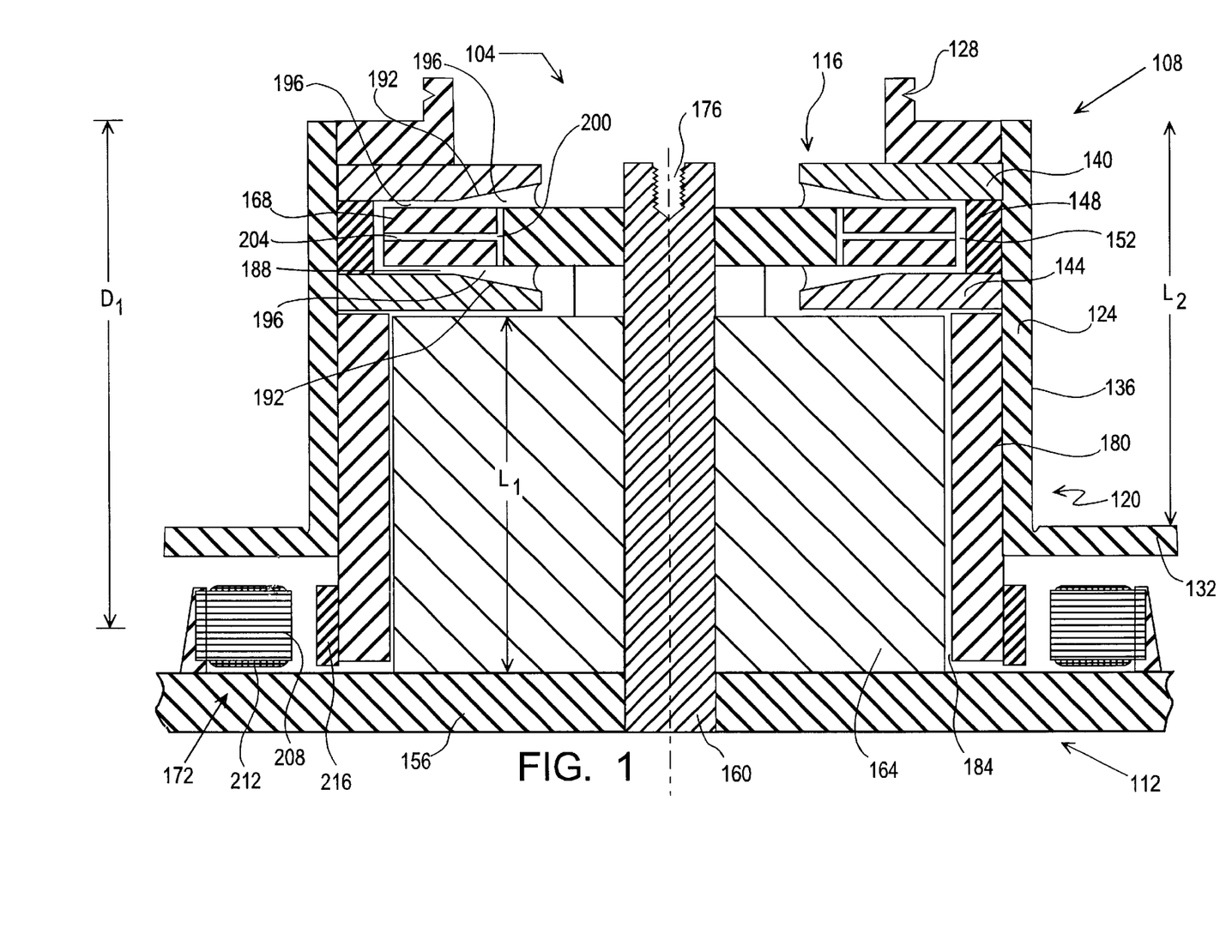
FIG. 1 is a cutaway view of a disk storage drive having an oil-filled thrust bearing and an air-filled radial bearing in accordance with an embodiment of the present invention.

With reference to FIG. 1, a hybrid bearing having oil-filled and air-filled bearing components constructed in accordance with one embodiment of the present invention is generally identified as hybrid bearing 104. The hybrid bearing 104 generally comprises a rotatable hub assembly 108, a stationary base assembly 112, rotating oil-filled bearing 116, and a rotating air-filled bearing 120. The rotatable hub assembly 108 generally comprises a hub 124. The hub 124 includes a retaining clamp groove 128, and a flange 132 to support storage disks (not shown) that are stacked on the hub 124 when the device is used in a computer storage drive. The hub 124 typically features a constant diameter outer mounting surface 136 to securely locate the storage disks (not shown) in a radial direction. The retaining clamp groove 128 is adapted to receive a retainer (not shown) to securely hold the disk stack (not shown) against the flange 132.

The rotating oil-filled bearing 116 generally comprises an upper bearing plate 140, a lower bearing plate 144, and a spacer 148. The upper 140 and lower 144 bearing plates are generally annular in shape and are fixed to the hub 124. Annular spacer 148 is interposed between the upper 140 and lower 144 bearing plates to maintain space 152 between the bearing plates 140 and 144.

A number of bearing components are fixed or interconnected to the base plate 156. These include a spindle 160, an air bearing element 164, an oil-filled bearing thrust plate 168, and a stator assembly 172. The spindle 160 is affixed to the base 156 at a first end and may also be secured to the top of the disk drive enclosure (not shown) at a second end using a fastener (not shown) inserted into a threaded hole 176 or by other means of attachment known in the art. Support of the shaft 160 on both ends is desirable because it increases the overall stiffness of the disk drive assembly.

The stationary air bearing element 164 is concentric to the spindle 160, and may be formed from a separate piece of material, or may be integral to the spindle 160. The air bearing element 164 has a very large diameter to increase the stiffness of the air bearing. The air bearing sleeve 180, which is part of the rotating hub assembly 108, generally encloses the diameter of the air bearing element 164. The air bearing sleeve 180 has an inside diameter that is slightly larger than the outside diameter of the air bearing element 164, so that a gap 184 is formed between the air bearing element 164 and the air bearing sleeve 180. The size of the gap 184 influences the stiffness of the bearing. As the gap 184 size decreases, the stiffness of the air bearing 120 increases. However, due to the large air bearing element 164 provided by the present invention, manufacturing tolerances of the air bearing element 164 and the air bearing sleeve 180 need not be any more stringent than the tolerances adhered to in conventional disk drive spindle bearing designs. In a preferred embodiment, the diameter of the air bearing element 164 is at least about 60% of the outside diameter of the hub outer mounting surface 136. In a more preferred embodiment, the diameter of the air bearing element 164 is at least about 75% of the outside diameter of the hub outer mounting surface 136. In yet another preferred embodiment, the diameter of the air bearing element 164 is at least as large as the thrust plate 168 of the oil-filled bearing 116.

The length or height $L_1$ of the air bearing 120 also influences the stiffness of the air bearing 120 in a radial direction. According to a preferred embodiment of the present invention, the length $L_1$ of the air bearing element 164 is at least about 50% of the length $L_2$ of the constant diameter outer mounting surface 136 of the hub 124. In a more preferred embodiment, the length of the air bearing element 164 is at least about 50% of the vertical distance $D_1$ between the horizontal centerline of the stator assembly 172 and the upper most extent of the constant diameter outer mounting surface 136.

The thrust bearing, generally identified as oil-filled bearing 116, generally comprises the aforementioned upper and lower bearing plates 140 and 144, and the thrust plate 168. The upper and lower bearing plates 140 and 144 rotate relative to the thrust plate 168, which substantially occupies the space 152 between the upper and lower bearing plates 140 and 144. The space 152 that is not occupied by the thrust plate 168 is filled with oil 188 that prevents direct contact between the bearing plates 140 and 144 and the thrust plate 168. Although the space between the upper and lower bearing plates 140 and 144 and the thrust plate 168 is relatively small towards an outside diameter of the thrust plate 168, the space increases towards the inside diameter of the upper and lower bearing plates 140 and 144. These spaces are the result of tapers 192 on the opposing faces of the upper and lower bearing plates 140 and 144. These tapers create capillaries 196, which serve to retain the oil 188 in the space between the upper and lower bearing plates 140 and 144 and the thrust plate 168. In addition to lubricating the oil bearing 116 components, the oil 188 creates a seal between the air bearing 120 region and the top of the hybrid bearing 104. In one embodiment, the oil 188 may be electrically conductive.

The capillaries 196 retain the oil 188 in position by taking advantage of the surface tension of the oil 188. In addition, when the drive is in use and the rotating hub 108 is rotating relative to the base assembly 112, centripetal forces tend to force the oil 188 towards the outer diameter of the oil filled bearing 116. Since this area is completely sealed by the upper and lower thrust plates 140 and 144 and the spacer 148, the oil 188 will be prevented from leaking out of the oil-filled bearing 116.

As loads, such as external shocks, are applied to the oil-filled bearing 116, the pressure exerted on the oil 188 will differ depending on the area under consideration. For example, if the rotating hub 108 is forced down, towards the base 156, the pressure on the oil 188 will be at a maximum between the upper bearing plate 140 and the top of the thrust plate 168. Typically, in response to such a pressure, some of the oil 188 would be forced out of the oil-filled bearing 116 between the upper bearing plate 140 and the thrust plate 168. To prevent oil 188 from leaking out of the oil-filled bearing 116 due to such occurrences, axial or through-hole passageways 200 are provided in the thrust bearing 168. The axial ports 200 allow oil to flow from an area of relatively high pressure on one side of the thrust plate 168 to an area of relatively low pressure on the other side of the thrust plate 168. In addition, the thrust plate 168 may be provided with radial passageways 204 to aid in the flow of oil 188 from areas of higher pressure to areas of lower pressure. According to one embodiment of the present invention, a plurality of oil-filled thrust bearings may be provided.

Figure 2:
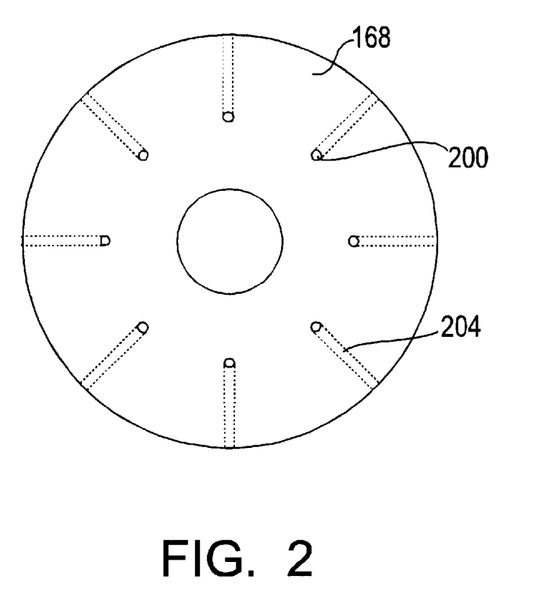
FIG. 2 is a top view of a thrust plate of an oil-filled bearing according to one embodiment of the present invention.

Referring now to FIG. 2, a top view of thrust bearing 168 is illustrated. In FIG. 2, an arrangement of axial through-hole passageways 200 and radial passageways 204 according to one embodiment of the present invention is illustrated. Of course, the particular arrangement of passageways 200 and 204 S can be varied according to where high pressure areas are expected to occur, and the number of passageways 200 and 204 may also be varied. Additionally, the size and configuration of the passageways 200 and 204 may be varied in balancing the stiffness of the oil-filled bearing 116 against allowing the oil 188 to flow freely within the oil-filled bearing 116.

The oil 188 of the oil-filled bearing 116 may be any viscous oil suitable for lubrication. According to one embodiment of the present invention, the oil 188 may be electrically conductive. In yet another embodiment, the oil 188 may be magnetically conductive. The oil 188 may be synthetic or mineral based. Furthermore, the oil 188 may be any viscous fluid. Preferably, the oil 188 has a viscosity that remains relatively constant as the temperature of the oil 188 changes, and that has lubricating properties to reduce wear on the oil-filled bearing 116 components. Also, it is preferable that the oil 188 exhibit low outgassing.

Figure 3:
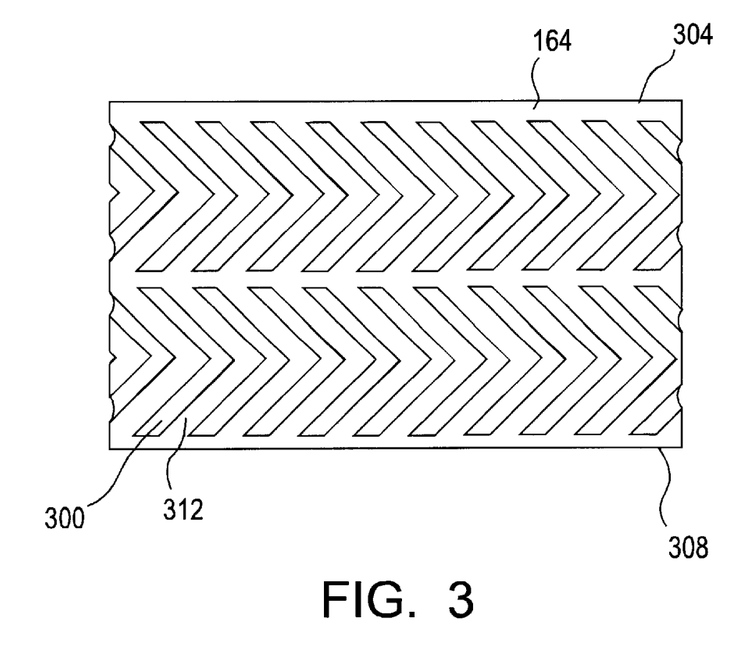
FIG. 3 is a side view of an air bearing element having a grooved surface in accordance with one embodiment of the present invention.

Referring now to FIG. 3, an air bearing element 164, according to one embodiment of the present invention is illustrated. The air bearing element 164 may be provided with grooves 300 designed to increase or generate air pressure towards middle portions of the air bearing element 164, and away from the top 304 and bottom 308 edges of the air bearing element 164. In the illustrated embodiment, the grooves 300 are shown as parallel rows of chevron-shaped grooves. However, any design suitable for drawing air away from the edges 304 and 308 of the air bearing element 164 and thereby increasing the air pressure along intermediate portions of the air bearing element 164 is suitable. For example, alternative grooves may be in the form of generally arcuate grooves, one row of chevron-shaped grooves, staggered grooves in parallel rows, etc. In yet another preferred embodiment, the width of the groove 300 is equal to the width of the land area 312 between adjacent grooves 300. In another preferred embodiment, the cross section of the grooves 300 is semicircular. In a further preferred embodiment, the cross section of the grooves 300 is square.

As an alternative to grooves 300 formed in the surface of the air bearing element 164, grooves may be formed in the surface of the air bearing sleeve 180. However, if formed in the sleeve 180 the grooves would generally point in the direction opposite of how they would point if formed on air bearing element 164. This is because the relative air flow against air bearing element 164 is opposite that of the air flow relative to air bearing sleeve 180. According to yet another embodiment of the present invention, the air pressure towards the medial portions of air bearing element 164 is increased or generated by means of protrusions on the surface of the air bearing element 164. As yet another embodiment of the present invention, protrusions may be formed on the interior surface of sleeve 180. As with grooves, the configuration and size of protrusions can be varied, so long as they generate increased air pressure along intermediate portions of the air bearing.

Regardless of whether grooves or protrusions are used to increase air pressure, they generally should not be formed on both the air bearing element 164 and the air bearing sleeve 180. This is because having such features on both surfaces prevents the proper development of high pressure areas. In addition, providing air pressure generating features on both surfaces increases manufacturing costs.

Referring again to FIG. 1, the stator assembly 172 includes laminations 208 and coils 212. When the coils 212 are supplied with an electrical current, a magnetic field is produced. This magnetic field is directed by the positioning of the coils 212 and by the positioning of the laminations 208. Generally, the magnetic field is directed towards magnets 216 that are affixed to the air bearing sleeve 160. The magnetic field generated by the stator assembly 172 interacts with the magnets 216 that are interconnected to the hub assembly 108. This interaction causes the rotation of the hub assembly 108 relative to the base assembly 112. The stator assembly 172 is generally arranged in a circle about the magnets 216 of the hub assembly 108.

According to the above-described embodiment, the air bearing sleeve 180 is preferably constructed from magnetic steel. Steel is desirable in this application because it can be machined to fine tolerances, assisting in the accurate formation of the gap 184 between the air bearing element 164 and the sleeve 180. In addition, the magnetic properties of steel enhance the interaction between the magnetic field produced by the coils 212 of the stator assembly 172 and the magnets 216. The air bearing element 164, and the upper and lower bearing plates 140 and 144, the thrust plate 168, and the spindle 160 may also be constructed from steel according to an embodiment of the present invention. Preferably, the hub 124 and the base 156 are constructed of aluminum. Aluminum is desirable in these components because it is easily machined, lightweight, can be machined to fine tolerances and is not magnetically conductive. Alternatively, the above-described components may be constructed from a ceramic or composite material.

In a preferred embodiment, the diameter of the spindle 160 is from about 4 mm to about 6 mm, the diameter of the air bearing element 164 is from about 14 mm to about 20 mm, the gap 184 between the air bearing element 164 and the sleeve 180 is from about 0.001 mm to about 0.005 mm, and the height of the air bearing element 164 is from about 10 mm to about 18 mm. The diameter of the thrust plate 168 may be from about 7 mm to about 12 mm, the thickness of the thrust plate 168 may be from about 1 mm to about 4 mm. The height of the spacer 148 is from about 1 mm to about 4 mm and the tapers 192 of the upper and lower bearing plates 140 and 144 may be from about 2° to about 10°.

Figure 4:
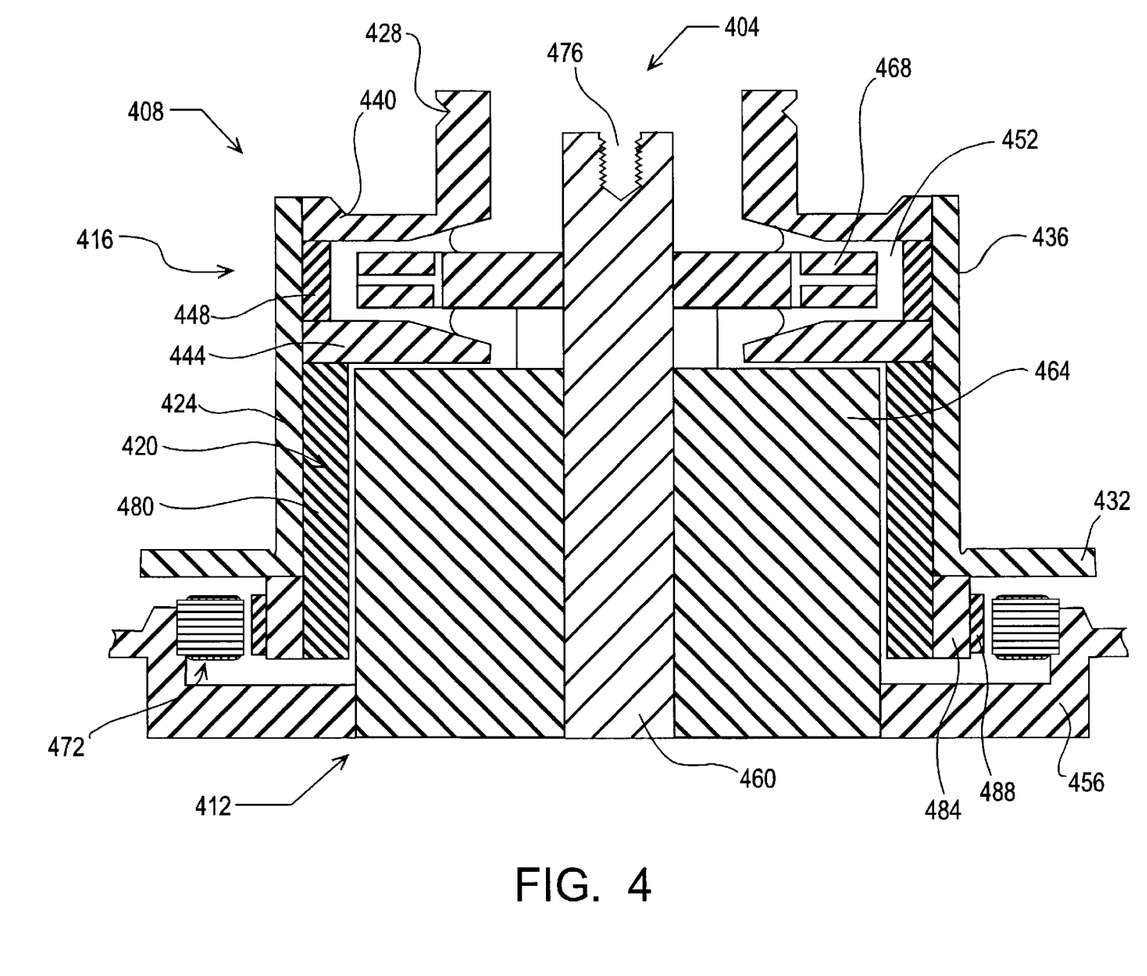
FIG. 4 is a cutaway view of a disk storage drive having an oil-filled thrust bearing and an air-filled radial bearing in accordance with yet another embodiment of the present invention.

Referring now to FIG. 4, another embodiment of the hybrid bearing of the present invention, identified generally as hybrid bearing 404, is illustrated. The hybrid bearing 404 generally includes a rotatable hub assembly 408 and a stationary base assembly 412. The bearing elements of hybrid bearing 404 are the oil-filled bearing assembly 416 and the air-filled bearing assembly 420. Many of the structural elements and features of the embodiment identified as hybrid bearing 404 are the same or similar to the features of the hybrid bearing 104. Therefore, the following discussion will concentrate on the areas in which these embodiments differ.

The rotatable hub assembly 408 generally includes the hub 424, which features a retaining clamp groove 428 and a flange 432. The hub 424 may include a constant diameter outer mounting surface 436 to locate storage disks (not shown) in a radial direction.

The rotating oil-filled bearing 416 comprises upper 440 and lower 444 thrust bearing plates, and a spacer 448. A space 452 is maintained between the upper 440 and lower 444 bearing plates by the spacer 448.

The base plate 456 is interconnected to a first end of a spindle 460 through an air bearing element 464. Thus, according to this embodiment, a portion of the circumference of the air bearing element 464 is in closely-fitting contact with the base plate 456. A stationary thrust plate 468 is affixed to a second end of the spindle 460. A threaded hole 476 may be provided in the second end of the spindle 460 for securing the second end of the spindle to the top of the disk drive enclosure (not shown).

A rotating air bearing sleeve 480 is interconnected to the interior of the hub 424. According to the hybrid bearing 404 of the embodiment illustrated in FIG. 4, the air bearing sleeve 480 is constructed from a ceramic or composite material, or from some other material that is not magnetically conductive. Therefore, hybrid bearing 404 includes a back iron component 484. The back iron 484 is constructed from a magnetically conductive material, such as steel, and is affixed to either the air bearing sleeve 480 or the hub 424. Affixed to the outer circumference of the back iron 484 are magnets 488. The magnets 488 interact with the stator 472 of the base assembly 412. In another embodiment, the air bearing sleeve may be constructed from a magnetically conductive material and the back iron may then be omitted.

The hybrid bearing 404 also features an upper thrust bearing plate 440 that is integral to the portion of the hub 424 that includes the retaining clamp groove 428. Although the spacer 448 is illustrated as a separate component, it could also be combined with upper thrust bearing plate 440. Alternatively, spacer 448 could be integral to the hub 424, or to the lower thrust bearing plate 444. Combining these components into one integral unit can increase the strength of the hub assembly 408. Of course, additional divisions or combinations of components are possible. However, it is important that the upper bearing plate 440 and the lower bearing plate 444 not be integral to each other, to allow insertion of the thrust plate 468 into the oil-filled bearing 416 as it is being assembled.

The invention in its broader aspects relates to a bearing apparatus used to support a rotating assembly. The apparatus is suitable for use with any rotating assembly, and in particular with computer storage devices, such as disk drives. The apparatus provides suitable levels of bearing stiffness, while being inexpensive to manufacture and consuming relatively little power. The apparatus also features very little nonrepeatable runout, allowing data to be stored on rotating storage media in high densities. Furthermore, the apparatus is inexpensive to manufacture and it has been designed to operate reliably.

The foregoing description of the present invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known for practicing the invention and to enable others skilled in the art to utilize the invention and such, or in other, embodiments and with various modifications required by the particular application or use of the invention. It is intended that the appended claims be construed to include alternative embodiments to the extent permitted by the prior art.

What is claimed is:

1. A disk drive, comprising:
 a stationary shaft interconnected to a base;
 an oil-filled rust bearing;
 an air-filled radial bearing defining a gap having a first diameter;
 a hub rotatably interconnected to said stationary shaft, wherein said hub is supported in an axial direction by said oil-filled thrust bearing and is supported in a radial direction by said air-filled radial bearing;
 a plurality of magnets interconnected to said hub; and
 a stator assembly for interacting with said magnets, wherein said stator assembly is arranged in a circular fashion to define a circle about said plurality of magnets, wherein said circle is concentric to said gap of said air-filled radial bearing, wherein said circle has a second diameter greater than said first diameter of said gap of said air-filled radial bearing, wherein a plane perpendicular to an axis of rotation of said hub that intersects said stator assembly along a line midway between said base and a top of said stator assembly also intersects said air filled bearing, and wherein a diameter of said air filled radial bearing is about equal to a diameter of said oil-filled thrust bearing.

2. The disk drive of claim 1, wherein said oil-filled thrust bearing comprises:

a stationary thrust plate having first and second surfaces;

a first rotating plate adjacent to said first surface of said stationary thrust plate; and a second rotating plate adjacent to said second surface of said stationary thrust plate.

3. The disk drive of claim 2, wherein said first and second rotating plates are annular in shape.

4. The disk drive of claim 3, wherein said first and second rotating plates have a first thickness at an inner diameter and a second thickness at an outer diameter, wherein said first thickness is less than said second thickness, such that tapered capillaries are formed between said first and second rotating plates and said first and second surfaces of said stationary thrust plate.

5. The disk drive of claim 2, wherein said stationary thrust plate has at least one first passageway extending from said first surface of said thrust plate to said second surface of said thrust plate.

6. The disk drive of claim 5, wherein said stationary thrust plate has at least one second passageway extending radially from the circumference of said stationary thrust plate to interconnect with said first passageway.

7. The disk drive of claim 1, wherein said air-filled radial bearing has a diameter at least as large as a diameter of said oil-filled thrust bearing.

8. The disk drive of claim 1, further comprising:

an interior volume enclosed by said hub;

an air bearing element fixed to said stationary shaft and disposed inside said hub, wherein said air bearing element has a volume that is greater than about 50% of said interior volume.

9. The disk drive of claim 8, wherein said air bearing element has grooves on at least one surface.

10. The disk drive of claim 8, wherein said air bearing element has ridges on at least one surface.

11. The disk drive of claim 8, wherein said air bearing element is integral to said stationary shaft.

12. The disk drive of claim 1, wherein said stationary shaft is fixedly interconnected to said base at a top and at a bottom of said shaft.

13. The disk storage drive of claim 1, wherein said oil is magnetic.

14. The disk drive of claim 1, wherein said oil is electrically conductive.

15. The disk drive of claim 1, comprising a plurality of oil-filled thrust bearings.

16. The disk drive of claim 1, comprising a plurality of air-filled radial bearings.

17. The disk drive of claim 1, wherein said bearing element is substantially cylindrical.

18. An electric motor bearing apparatus for a disk drive, comprising:

a rotatable hub;

a stationary base;

a stationary shaft having a first end and a second end, said first end interconnected to said base;

an air bearing element interconnected to said stationary shaft wherein said air bearing element and an interior of said hub cooperate to support said rotating hub in a radial direction, and wherein said air bearing element extends in an axial direction from said stationary base to a point distal from said stationary base, where said point distal from said stationary base is between said first end and said second end of said shaft;

an annular thrust plate having first and second surfaces interconnected to said stationary shaft;

a first bearing plate interconnected to said hub and located adjacent to said first surface of said annular thrust plate;

a second bearing plate interconnected to said hub and located adjacent to said second surface of said annular thrust plate, wherein said first bearing plate and said second bearing plate are supported by said annular thrust plate in an axial direction;

a viscous fluid filling the spaces between said annular thrust plate and said first bearing plate, and between said annular thrust plate and said second bearing plate, wherein said rotatable hub is supported in an axial direction by said bearing plates in cooperation with said viscous fluid and said annular thrust plate; and a plurality of magnets interconnected to said rotatable hub, wherein said plurality of magnets are arranged about a circle having a diameter greater than a diameter of said air bearing element.

19. The electric motor bearing apparatus for a disk drive of claim 18, wherein said viscous fluid is oil.

20. The electric motor bearing apparatus for a disk drive of claim 18, wherein said air bearing has a diameter at least as large as a diameter of said annular thrust plate.

21. The electric motor bearing apparatus for a disk drive of claim 18, wherein a surface of said first bearing plate is at a first distance from said annular thrust plate at an inwardly disposed diameter and at a second distance from said annular thrust plate at an outwardly disposed diameter, and wherein said first distance is greater than said second distance.

22. The electric motor bearing apparatus for a disk drive of claim 18, wherein a surface of said second bearing plate is at a first distance from said annular thrust plate at an inwardly disposed diameter and at a second distance from said annular thrust plate at an outwardly disposed diameter, and wherein said first distance is greater than said second distance.

23. The electric motor bearing apparatus for a disk drive of claim 18, wherein said annular thrust plate comprises at least one passageway from said first surface of said annular thrust plate to said second surface of said annular thrust plate.

24. The electric motor bearing apparatus for a disk drive of claim 18, wherein said air bearing is provided with pressure generating features.

25. The electric motor bearing apparatus for a disk drive of claim 24, wherein said pressure generating features comprise grooves.

26. The electric motor bearing apparatus for a disk drive of claim 24, wherein said pressure generating features comprise protrusions.

27. The electric motor bearing apparatus for a disk drive of claim 18, wherein said interior of said hub is provided with pressure generating features.

28. The electric motor bearing apparatus for a disk drive of claim 27, wherein said pressure generating features comprise grooves.

29. The electric motor bearing apparatus for a disk drive of claim 27, wherein said pressure generating features comprise protrusions.

30. The electric motor bearing apparatus for a disk drive of claim 18, wherein said air bearing element and said stationary shaft are integral to one another.

31. The electric motor bearing apparatus for a disk drive of claim 18, wherein at least one of said first bearing plate and said second bearing plate are integral to said hub.

32. The electric motor bearing apparatus for a disk drive of claim 18, further comprising a sleeve interconnected to said interior of said hub, wherein a gap is formed between an interior surface of said sleeve and an outer surface of said air bearing element, and wherein said sleeve and said bearing element cooperate to support said rotating hub in a radial direction.

33. A bearing for a computer disk drive device, comprising:
   base means;
   rotatable hub means for supporting at least one storage disk;
   a stationary shaft fixed to said base means at a first end and having means for receiving a fastener disposed at a second end opposite said base means;
   oil filled bearing means for supporting said rotatable hub means in an axial direction; and
   air-filled bearing means for supporting said rotatable hub means in a radial direction, wherein said air-filled bearing means has a first area and a first diameter; and
   a plurality of magnets interconnected to said hub, wherein said plurality of magnets are located outside of said first diameter, wherein at least a first of said plurality of magnets has a width and a length to define a second area, wherein a majority of said second area overlaps with at least a portion of said first area when said second area is considered along a line perpendicular to an axis of said stationary shaft.

34. The bearing for a computer disk drive device of claim 33, wherein said oil filled bearing means comprises means for retaining said oil in said oil filled bearing.

35. The bearing for a computer disk drive device of claim 33, wherein said air filled bearing means comprises means for generating increased air pressure in said air bearing.

36. The bearing for a computer disk drive device of claim 33, wherein said air-filled bearing means is substantially cylindrical.

37. A disk drive, comprising:
   a stationary shaft having a first end and a second end, said first end interconnected to a base;
   an oil-filled thrust bearing;
   an air-filled radial bearing defining a gap having a first diameter, wherein said second end of said stationary shaft extends beyond and end of said air filled radial bearing;
   a hub rotatably interconnected to said stationary shaft, wherein said hub is supported in an axial direction by said oil-filled thrust bearing and is supported in a radial direction by said air-filled radial bearing;
   a plurality of magnets interconnected to said hub; and
   a stator assembly for interacting with said magnets, wherein said stator assembly is arranged in a circular fashion to define a circle about said plurality of magnets, wherein said circle is concentric to said gap of said air-filled radial bearing, wherein said circle has a second diameter greater than said first diameter of said gap of said air-filled radial bearing, and wherein a plane perpendicular to an axis of rotation of said hub that intersects said stator assembly along a line midway between said base and a top of said stator assembly also intersects said air filled bearing.

38. The disk drive of claim 37, wherein said oil-filled thrust bearing comprises:
   a stationary thrust plate having first and second surfaces;
   a first rotating plate adjacent to said first surface of said stationary thrust plate; and
   a second rotating plate adjacent to said second surface of said stationary thrust plate.

39. The disk drive of claim 38, wherein said first and second rotating plates are annular in shape.

40. The disk drive of claim 39, wherein said first and second rotating plates have a first thickness at an inner diameter and a second thickness at an outer diameter, wherein said first thickness is less than said second thickness, such that tapered capillaries are formed between said first and second rotating plates and said first and second surfaces of said stationary thrust plate.

41. The disk drive of claim 38, wherein said stationary thrust plate has at least one first passageway extending from said first surface of said thrust plate to said second surface of said thrust plate.

42. The disk drive of claim 41, wherein said stationary thrust plate has at least one second passageway extending radially from the circumference of said stationary thrust plate to interconnect with said first passageway.

43. The disk drive of claim 37, wherein said air-filled radial bearing has a diameter at least as large as a diameter of said oil-filled thrust bearing.

44. The disk drive of claim 37, further comprising:
   an interior volume enclosed by said hub;
   an air bearing element fixed to said stationary shaft and disposed inside said hub, wherein said air bearing element has a volume that is greater than about 50% of said interior volume.

45. The disk drive of claim 44, wherein said air bearing element has grooves on at least one surface.

46. The disk drive of claim 44, wherein said air bearing element has ridges on at least one surface.

47. The disk drive of claim 44, wherein said air bearing element is integral to said stationary shaft.

48. The disk drive of claim 37, wherein said stationary shaft is fixedly interconnected to said base at a top and at a bottom of said shaft.

49. The disk storage drive of claim 37, wherein said oil is magnetic.

50. The disk drive of claim 37, wherein said oil is electrically conductive.

51. The disk drive of claim 37, comprising a plurality of oil-filled thrust bearings.

52. The disk-drive of claim 37, comprising a plurality of air-filled radial bearings.

53. The disk drive of claim 37, wherein said air filled radial bearing is substantially cylindrical.

* * * * *

UNITED STATES PATENT AND TRADEMARK OFFICE
CERTIFICATE OF CORRECTION

PATENT NO.    : 6,483,215 B1
DATED         : November 19, 2002
INVENTOR(S)   : Bodmer et al.

It is certified that error appears in the above-identified patent and that said Letters Patent is hereby corrected as shown below:

Column 8,
Line 52, delete the word "rust" and substitute the word -- thrust -- therefor.

Column 11,
Line 51, delete the word "and" and substitute the word -- an -- therefor.

Signed and Sealed this

Fourth Day of March, 2003

JAMES E. ROGAN
*Director of the United States Patent and Trademark Office*